US008754748B2

(12) United States Patent
Orlassino

(10) Patent No.: US 8,754,748 B2
(45) Date of Patent: Jun. 17, 2014

(54) RFID WIRELESS SCANNING SYSTEM FOR NON-RFID MOBILE DEVICES, AND RELATED OPERATING METHODS

(75) Inventor: Mark Orlassino, Centereach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1253 days.

(21) Appl. No.: 12/171,149

(22) Filed: Jul. 10, 2008

(65) Prior Publication Data

US 2010/0007496 A1    Jan. 14, 2010

(51) Int. Cl.
*G08G 5/00*    (2006.01)
*H04Q 5/22*    (2006.01)
*G08B 13/14*   (2006.01)
*G08B 1/08*    (2006.01)

(52) U.S. Cl.
USPC .............. 340/10.1; 340/572.1; 340/539.22; 340/568.1; 455/73; 455/411; 455/414.1; 709/203

(58) Field of Classification Search
USPC .................. 340/10.1, 572.1, 539.22, 568
See application file for complete search history.

(56) References Cited

U.S. PATENT DOCUMENTS

| 7,075,412 | B1* | 7/2006 | Reynolds et al. | 340/10.2 |
|---|---|---|---|---|
| 7,180,422 | B2* | 2/2007 | Milenkovic et al. | 340/572.4 |
| 8,131,263 | B2* | 3/2012 | Endrikhovski et al. | 455/412.1 |
| 2003/0132298 | A1* | 7/2003 | Swartz et al. | 235/472.02 |
| 2005/0253704 | A1* | 11/2005 | Neuwirth | 340/539.13 |
| 2006/0145815 | A1* | 7/2006 | Lanzieri et al. | 340/10.2 |
| 2006/0176178 | A1* | 8/2006 | Everest et al. | 340/572.1 |
| 2006/0220791 | A1* | 10/2006 | Willins et al. | 340/10.3 |
| 2006/0280149 | A1* | 12/2006 | Kuhl et al. | 370/338 |
| 2007/0103303 | A1* | 5/2007 | Shoarinejad | 340/572.1 |
| 2007/0285245 | A1* | 12/2007 | Djuric et al. | 340/572.1 |
| 2008/0283599 | A1* | 11/2008 | Rasband et al. | 235/439 |

* cited by examiner

*Primary Examiner* — Fekadeselassie Girma

(57) ABSTRACT

A wireless scanning system for obtaining data related to items includes a radio frequency identification (RFID) reader configured to interrogate RFID tags and obtain tag data from interrogated RFID tags, and a mobile wireless device that is incapable of interrogating RFID tags. The system uses a device RFID tag in close proximity to the mobile wireless device, where the device RFID tag is configured to convey data that identifies the mobile wireless device when interrogated by the RFID reader. When the mobile wireless device is within close proximity to an item of interest having a corresponding item RFID tag, the RFID reader interrogates the device RFID tag and the item RFID tag. Thereafter, the RFID reader routes the item tag data in a manner destined for the mobile wireless device. This system enables the mobile wireless device to obtain the item tag data even though the mobile wireless device has no native RFID reader capabilities.

14 Claims, 7 Drawing Sheets

RFID WIRELESS SCANNING SYSTEM FOR NON-RFID MOBILE DEVICES, AND RELATED OPERATING METHODS

TECHNICAL FIELD

Embodiments of the subject matter described herein relate generally to wireless scanning systems such as radio frequency identification (RFID) systems. More particularly, embodiments of the subject matter relate to a system and operating methods for enabling a non-RFID mobile device to obtain RFID tag data.

BACKGROUND

The prior art includes a variety of wireless scanning systems and equipment that can be used to obtain data related to assets, products, and other items. For example, wireless barcode scanners and wireless RFID systems are now commonly used in a number of applications. RFID systems are well known and the prior art includes different types of RFID systems, different applications for RFID systems, and different data communication protocols for RFID systems. RFID systems are commonly utilized for product tracking, product identification, and inventory control in manufacturing, warehouse, and retail environments. Briefly, an RFID system includes two primary components: a reader (also known as an interrogator); and a tag (also known as a transponder). The tag is a miniature device that is capable of responding, via an air channel, to an RF signal generated by the reader. The tag is configured to generate a reflected RF signal in response to the RF signal emitted from the reader. The reflected RF signal is modulated in a manner that conveys identification data back to the reader. The identification data can then be stored, processed, displayed, or transmitted by the reader as needed. Some practical RFID system deployments include multiple RFID readers in relatively close proximity to each other. For example, a warehouse deployment may include readers positioned near multiple cargo bays, doorways, storage units, or the like. Furthermore, any number of portable handheld readers may be introduced into the RFID system environment.

Mobile barcode scanners and other non-RFID scanners may also be used to obtain product information. Barcode scanners may utilize optical reader technology to read barcodes that are usually printed on (or affixed to) the items of interest. Most barcode scanners are considered to be non-RFID equipment because they do not include the functionality of an RFID reader. In other words, most barcode readers are incapable of interrogating RFID tags.

Many common product manufacturers are beginning to place RFID tags on products, boxes, pallets, and containers. However, many wholesale purchasers (e.g., retail stores) have not yet invested in RFID equipment. In other words, most wholesale purchasers are still using legacy barcode scanners in lieu of RFID readers. Consequently, these wholesale purchasers are unable to take advantage of the benefits of RFID technology. Unfortunately, purchasing a fleet of RFID readers and/or upgrading non-RFID scanners to include RFID reader functionality may represent a significant expense. Moreover, legacy non-RFID scanners are unable to obtain product information from RFID-tagged items, unless those items also include barcodes (or other readable non-RFID information). Therefore, there remains a need for a non-RFID scanner to be able to obtain data from items that only include RFID tags.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

The systems and methods described here can be implemented to add RFID capability to legacy scanners without having to add RFID reader functionality to the legacy scanners. This allows the legacy scanners to obtain RFID tag data from products that include RFID tags. For the sake of brevity, conventional techniques related to wireless data communication, positioning, network control, RFID data transmission, RFID system architectures, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 1:
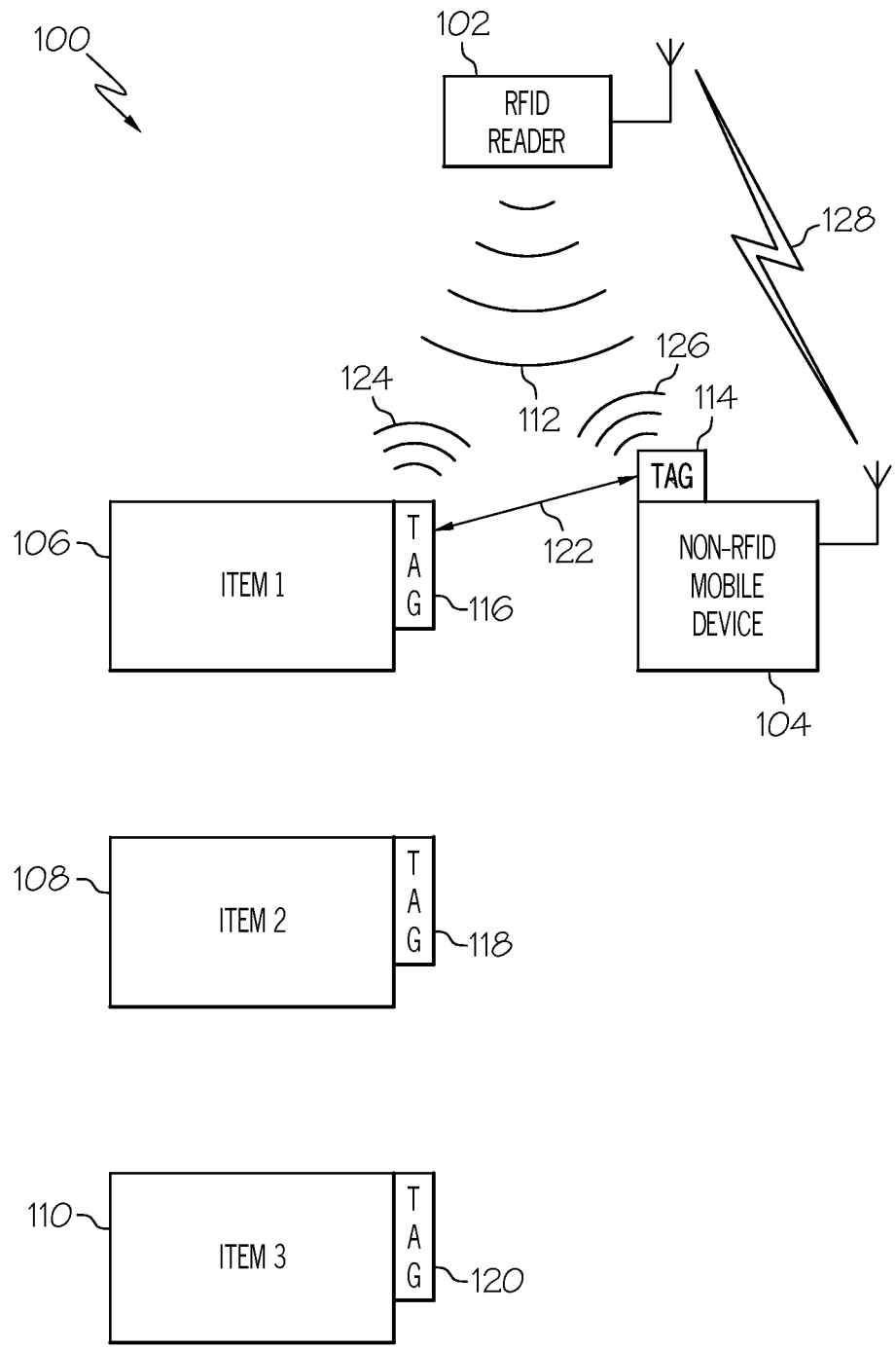
FIG. 1 is a schematic representation of a scanning system configured in accordance with one exemplary embodiment.

FIG. 1 is a schematic representation of a wireless scanning system 100 configured in accordance with one exemplary embodiment. Scanning system 100 in its basic form includes, without limitation, at least one RFID reader 102 and a mobile wireless device 104. RFID reader 102 and mobile wireless device 104 cooperate within an operating environment, which may include any number of items of interest. For the illustrated example, the operating environment includes three items 106, 108, and 110 near RFID reader 102 (preferably, within the interrogation range of RFID reader 102). Scanning system 100 is suitably configured to obtain data related to such items of interest. In practice, scanning system 100 may include any number of RFID readers configured to support any number of mobile wireless devices within an environment having any number of items of interest. FIG. 1 depicts a very simple implementation for ease of description. In practice, however, two or more RFID readers may be desirable to increase the accuracy of locationing and positioning calculations.

RFID reader 102 is suitably configured to interrogate RFID tags, and to obtain tag data from interrogated RFID tags. In certain embodiments, RFID reader 102 interrogates RFID tags within its interrogation range in response to a triggering event at mobile wireless device 104. For example, the user of mobile wireless device 104 may activate a button, switch, touch screen, touchpad, or other user interface element of mobile wireless device 104 to initiate interrogation by RFID reader 102. The tag data is conveyed in respective return signals generated by the RFID tags in response to interrogation signals transmitted by RFID reader 102. For the illustrated embodiment, RFID reader 102 generates interrogation signals 112 with sufficient energy to interrogate RFID tags within the interrogation range of RFID reader 102. RFID reader 102 may leverage well known RFID operating methodologies and technologies to interrogate nearby RFID tags and to receive return signals from responding RFID tags.

As described here, mobile wireless device 104 is a non-RFID device. In other words, mobile wireless device 104 is a device that is incapable of interrogating RFID tags on its own. In certain embodiments, mobile wireless device 104 may be a legacy non-RFID scanner, such as a conventional barcode scanner, a conventional optical image scanner, or the like. Thus, mobile wireless device 104 may support other scanning techniques and methodologies other than RFID. In this regard, mobile wireless device 104 may be configured to scan items (including items 106, 108, and 110) using a non-RFID scanning technique.

Notably, scanning system 100 includes or cooperates with a device RFID tag 114 that is in close proximity to mobile wireless device 104. In some embodiments, device RFID tag 114 may be coupled, attached, or affixed to mobile wireless device 104. In other embodiments, device RFID tag 114 may be integrated with or incorporated into mobile wireless device 104. Device RFID tag 114 is suitably configured for compatibility with RFID reader 102. In other words, RFID reader 102 can interrogate device RFID tag 114 using interrogation signals 112, and RFID reader 102 can receive return signals from device RFID tag 114 in response to interrogation signals 112. As described in more detail below, device RFID tag 114 is preferably configured and manufactured to convey device tag data that identifies mobile wireless device 104 when it is interrogated by RFID reader 102. The device tag data may also include or represent additional information associated with mobile wireless device 104, e.g., data related to its operating configuration, user settings, parameters related to its operating status or condition, location or position data, etc.

Scanning system 100 may also include or cooperate with item RFID tags 116, 118, and 120 for items 106, 108, and 110, respectively. Each item RFID tag is in close proximity to its corresponding item of interest. In some embodiments, an item RFID tag may be coupled, attached, or affixed to its respective item of interest. In other embodiments, the item RFID tag may be integrated with, incorporated into, or packaged with its respective item of interest. As described herein, an item RFID is suitably configured for compatibility with RFID reader 102. In other words, RFID reader 102 can interrogate item RFID tags using interrogation signals 112, and RFID reader 102 can receive return signals from item RFID tags in response to interrogation signals 112. As described in more detail below, an item RFID tag is preferably configured and manufactured to convey item tag data related to or associated with the respective item of interest.

Scanning system 100 (or a component thereof, such as RFID reader 102) responds when mobile wireless device 104 is near to an item of interest. FIG. 1 depicts a scenario where mobile wireless device 104 is relatively close to item 106, and relatively far from items 108 and 110. In accordance with one preferred embodiment, RFID reader 102 generates one or more interrogation signals 112 in response to a user-initiated event that occurs at mobile wireless device 104, e.g., activating or engaging a button, a switch, or a manual finger trigger of the mobile wireless device 104. A voice command or a detectable gesture may also represent such a user-initiated event. The activation of mobile wireless device 104 in this manner corresponds to the user's desire to scan an item or items within close physical proximity of mobile wireless device 104.

In accordance with an alternate embodiment, RFID reader 102 generates one or more interrogation signals 112 when item RFID tag 116 and device RFID tag 114 are separated by a distance 122 that is less than a threshold distance. It should be appreciated that distance 122 (and other measured or detected distances mentioned herein) represents a Euclidean distance in three-dimensional space, even though the figures depict distance 122 in only two dimensions. In accordance with an alternate and equivalent embodiment, RFID reader 102 generates one or more interrogation signals 112 when item 106 and mobile wireless device 104 are separated by a distance that is less than a threshold Euclidean distance. The threshold distance is selected to function as a metric or indicator of a user's desire to scan an item of interest using mobile wireless device 104. In practice, the threshold distance may be designated to be about four to six inches, although other threshold distances may be suitable. If, for example, the threshold distance is six inches, then RFID reader 102 will assume that the holder of mobile wireless device 104 intends to scan item 106 if it determines that the actual distance 122 is less than six inches. Conversely, if the distance between device RFID tag 114 and item RFID tag 118 (for item 108) is greater than the threshold distance, then RFID reader 102 will assume that the user of mobile wireless device 104 does not intend to scan item 108 at that time.

In accordance with one preferred embodiment, the user of mobile wireless device 104 initiates an interrogation cycle by triggering mobile wireless device 104. In response to such a trigger, mobile wireless device 104 may send an interrogation request, command, signal, or message to RFID reader 102 (using, for example, a wireless link 128). In response to the interrogation request, RFID reader 102 interrogates device RFID tag 114 and item RFID tags 116, 118, 120. Moreover, the interrogation request may identify mobile wireless device 104, which allows RFID reader 102 to determine where to send the data obtained by the interrogation. Using suitable locationing and/or positioning methodologies, RFID reader 102 and or mobile wireless device 104 determines whether or not an item RFID tag is within a configurable scan range, radius, or zone of mobile wireless device 104. Item RFID tags that are within the scan range of mobile wireless device 104 can then be considered to be "candidates" for the user's desired scan operation, while item RFID tags that are outside the scan range of mobile wireless device 104 can be ignored or disregarded. In other words, system 100 assumes that the user did not intend to scan any item RFID tags that are outside the scan range of mobile wireless device 104.

If more than one item RFID tag is detected within the scan range of mobile wireless device 104, then system 100 can take appropriate action (as described further below with reference to FIG. 5). For example, system 100 could determine which of those item RFID tags is closest to device RFID tag 114 (assuming that the closest item RFID tag corresponds to the item of interest that is being scanned) and send the associated tag data back to mobile wireless device 104. Alternatively, system 100 could indicate to the user that multiple item RFID tags have been detected within the scan zone, allowing the user to select which one corresponds to the intended scan item. In this regard, mobile wireless device 104 may be suitably configured to display a graphical representation of the locations of nearby item RFID tags within its scan zone, and the associated tag data. Such an implementation need not rely on user-initiated trigger events, and mobile wireless device 104 may obtain and display tag data and updated position data for the different item RFID tags in an ongoing or frequently refreshed manner.

FIG. 1 depicts the scenario where the distance 122 between item RFID tag 116 and device RFID tag 114 is less than the stated threshold distance, where the distance between item RFID tag 118 and device RFID tag 114 is greater than the stated threshold distance, and where the distance between item RFID tag 120 and device RFID tag 114 is greater than the stated threshold distance. Under these conditions, RFID reader 102 interrogates item RFID tag 116 and "relays" or "forwards" to mobile wireless device 104 at least some of the item tag data it receives from item RFID tag 116. In certain embodiments, RFID reader 102 will interrogate both item RFID tag 116 and device RFID tag 114. As depicted in FIG. 1, assuming that item 106 and mobile wireless device 104 are both within the interrogation range of RFID reader 102, they will respond with respective return (reflected) signals 124 and 126. Return signal 124 conveys item tag data corresponding to item 106, and return signal 126 conveys device tag data corresponding to mobile wireless device 104.

The device tag data conveyed in return signal 126 may include an identifier for mobile wireless device 104. This identifier may include, define, or represent, without limitation: an IP address; a network address; a serial number; a universally unique identifier (UUID), a globally unique identifier (GUID), a media access control (MAC) address, or any information that uniquely identifies mobile wireless device 104 within the relevant network or operating domain. RFID reader 102 uses this identifier to determine how best to route, transmit, or convey the item tag data to mobile wireless device 104. In some embodiments, the device tag data may include, convey, or represent information related to the current position or location of mobile wireless device 104 (such as GPS data, position coordinates, triangulation data, or the like).

Scanning system 100 represents one embodiment where RFID reader 102 is suitably configured to wirelessly transmit the item tag data directly to mobile wireless device 104 via at least one wireless link 128. In practice, the item tag data can be formatted or processed as needed for compatibility with the particular wireless data communication scheme or protocol used for wireless link 128. For example, RFID reader 102 can create data packets, data frames, or any data construct that is suitable for wireless transport. In certain embodiments, RFID reader 102 transmits the item tag data to mobile wireless device 104 in a manner that is compatible with, but not limited to, IEEE Specifications (such as 802.11, any applicable and relevant variant thereof).

Figure 2:
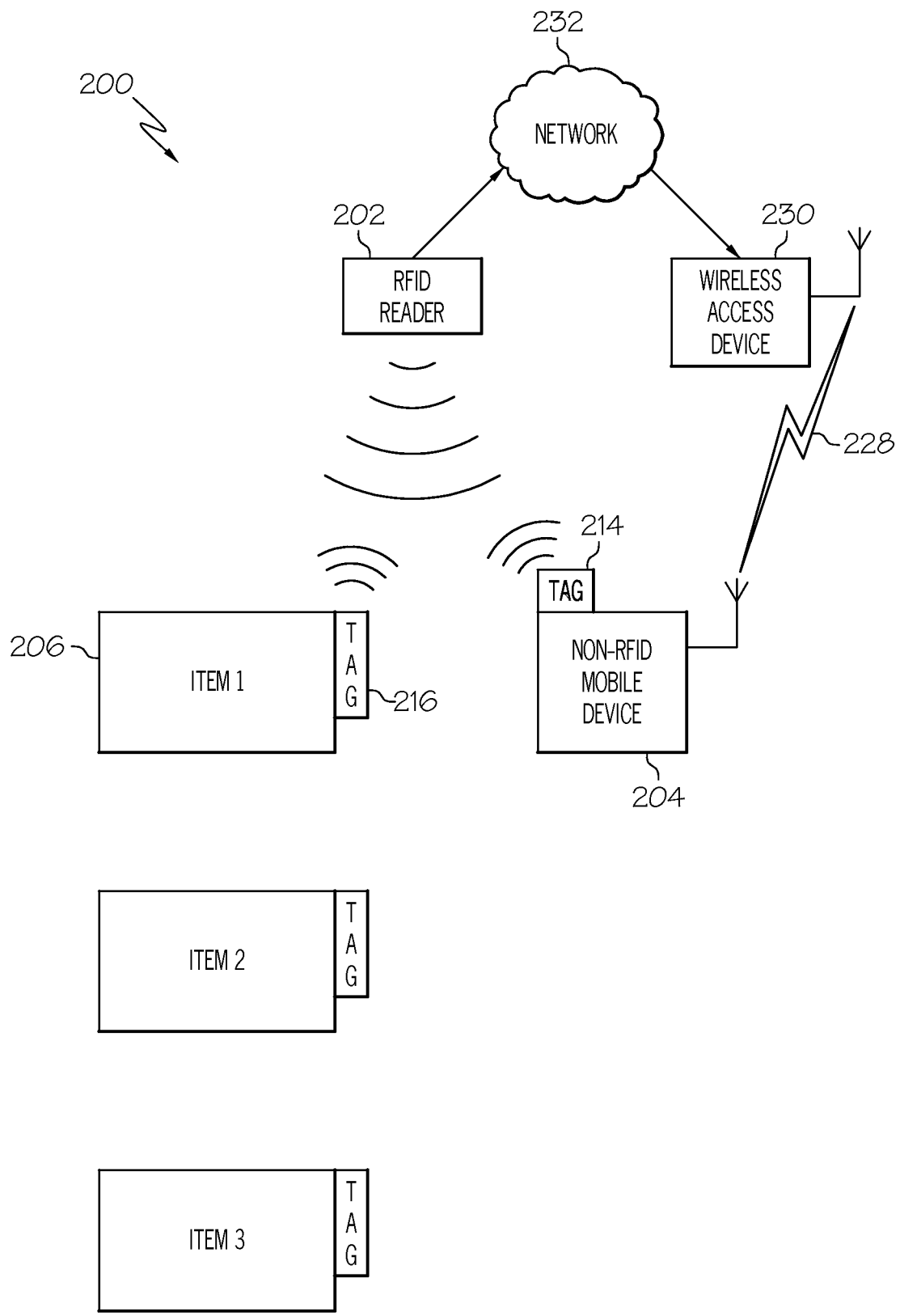
FIG. 2 is a schematic representation of a scanning system configured in accordance with another exemplary embodiment.

FIG. 2 is a schematic representation of a scanning system 200 configured in accordance with another exemplary embodiment. Scanning system 200 generally includes, without limitation: an RFID reader 202; a non-RFID mobile wireless device 204; an item 206; a device RFID tag 214; an item RFID tag 216; and a wireless access device 230 coupled to RFID reader 202 via a network 232. Scanning system 200 is similar to scanning system 100 in many respects and, therefore, common features, functions, and characteristics will not be redundantly described here.

Depending upon the particular implementation, wireless access device 230 may be realized as a wireless access port, which is a "thin" device that relies on the network intelligence, processing power, and management functions provided by a wireless switch (which would be implemented in network 232). Alternatively, wireless access device 230 may be realized as a wireless access point, which is a "fat" device that includes its own network intelligence, processing power, and management functions. Briefly, wireless access device 230 as described herein is suitably configured to receive data from wireless clients over wireless links. Once that data is captured by wireless access device 230, the data can be processed for communication within and by network 232. For example, the data can be encapsulated into a packet format compliant with a suitable data communication protocol. In certain embodiments, data is routed within network 232 using conventional Ethernet 802.3 addressing (including standard Ethernet destination and source packet addresses). In alternate embodiments, data can be routed within network 232 using conventional Internet Protocol ("IP") techniques.

Wireless access device 230 is suitably configured to transmit and receive data using wireless data communication techniques and protocols. Wireless access device 230 connects users to other users within the network and also can serve as the point of interconnection between a WLAN and a fixed wire network. Wireless access device 230 can serve multiple users within a defined network area. As a wireless client (such as mobile wireless device 204) moves beyond the range of one wireless access device, the wireless client can be automatically handed over to another wireless access device.

Wireless access device 230 generally includes a radio module that includes a receiver and a transmitter (or a transceiver). The radio module is suitably configured to communicate with wireless clients, such as mobile wireless device 204, via wireless data communication links. In exemplary embodiments, the radio module is configured to support WLAN connectivity in compliance with established IEEE Standards, such as 802.11a, 802.11b, and other established variants of 802.11. Of course, wireless access device 230 may be configured to support alternate or additional wireless data communication protocols, including future variations of 802.11.

Scanning system 200 operates substantially as described above for scanning system 100—RFID reader 202 interrogates item RFID tag 216 and device RFID tag 214 when the distance between item RFID tag 216 (or item 206 itself) and device RFID tag 214 (or mobile wireless device 204 itself) is less than a predetermined threshold distance. As explained above, in response to the interrogation, RFID reader 202 obtains item tag data and device tag data. In contrast to scanning system 100, however, RFID reader 202 does not wirelessly communicate item tag data directly to mobile wireless device 204. Rather, RFID reader 202 is suitably configured to route the item tag data to wireless access device 230. As mentioned above with reference to scanning system 100, the device tag data obtained by RFID reader 202 may include an identifier for mobile wireless device 204, and the manner in which RFID reader 202 routes the item tag data will be influenced by the identifier.

After receiving the item tag data, wireless access device 230 can wirelessly transmit the item tag data directly to mobile wireless device 204 via at least one wireless link 228. In practice, the item tag data can be formatted or processed as needed for compatibility with the particular wireless data communication scheme or protocol used for wireless link 228. As mentioned previously, wireless access device 230 may transmit data packets in compliance with IEEE Specification 802.11 (any applicable and relevant variant).

Figure 3:
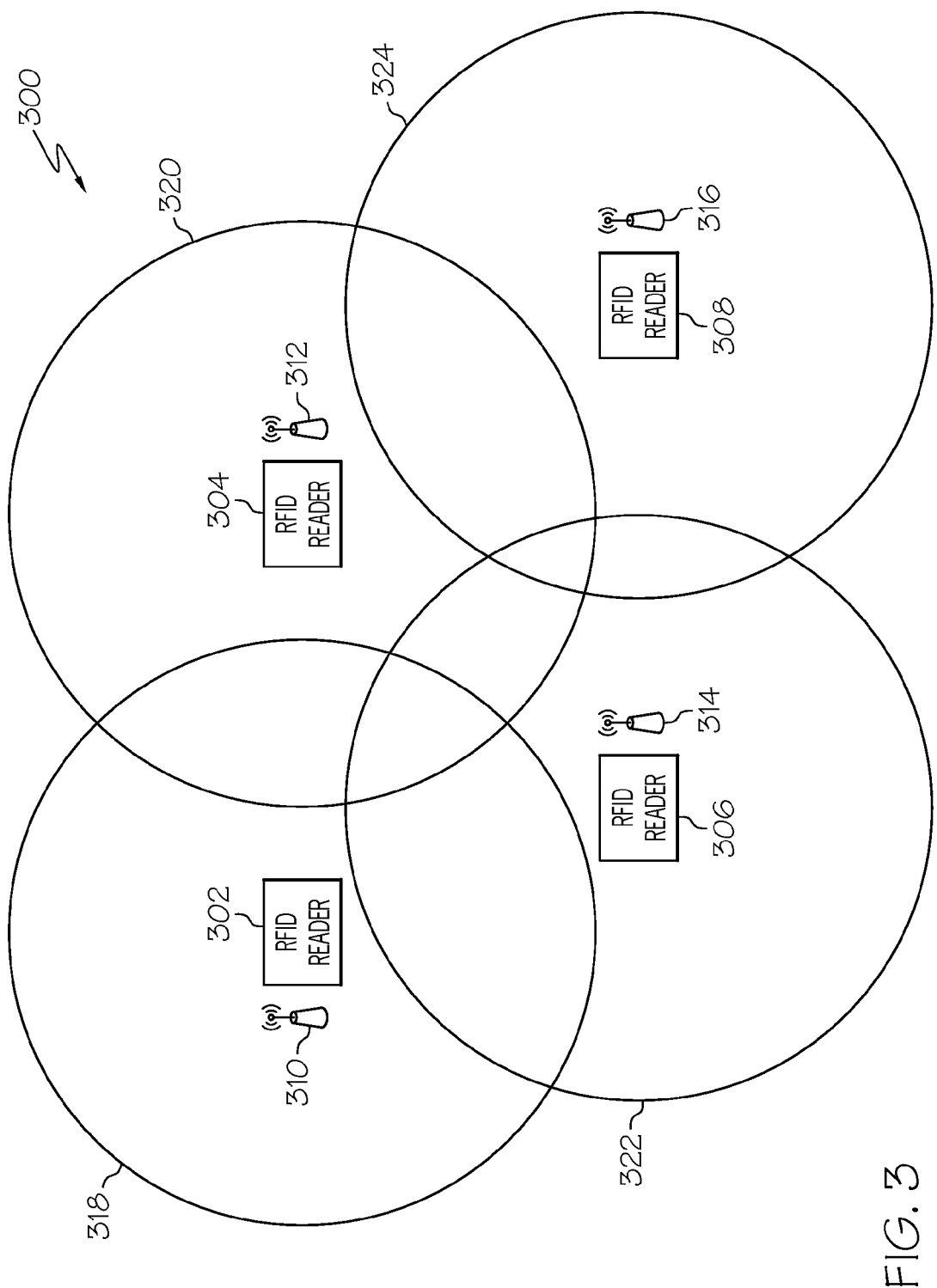
FIG. 3 is a diagram that illustrates a scanning system environment.

Scanning system 200 may be utilized in an environment where a plurality of RFID readers and a plurality of wireless access devices are deployed. For example, FIG. 3 is a diagram that illustrates a scanning system environment 300 that includes multiple RFID readers and multiple wireless access devices. This simplified depiction includes four RFID readers 302, 304, 306, and 308, and four wireless access devices 310, 312, 314, and 316. In this embodiment, each RFID reader is located in close proximity to a wireless access device: RFID reader 302 is paired (i.e., associated) with wireless access device 310; RFID reader 304 is paired (i.e., associated) with wireless access device 312; RFID reader 306 is paired (i.e., associated) with wireless access device 314; and RFID reader 308 is paired (i.e., associated) with wireless access device 316. Such co-location may be desirable to simplify the routing of item tag data from an RFID reader to a wireless access device. More specifically, if RFID readers are associated with wireless access devices on a one-to-one basis, then each RFID reader will have a default wireless access device for purposes of routing item tag data.

FIG. 3 schematically depicts how the RFID readers and wireless access devices can provide coverage for a relatively large scanning system environment 300. Here, a wireless range 318 represents the range of RFID reader 302 and/or wireless access device 310, a wireless range 320 represents the range of RFID reader 304 and/or wireless access device 312, a wireless range 322 represents the range of RFID reader 306 and/or wireless access device 314, and a wireless range 324 represents the range of RFID reader 308 and/or wireless access device 316. Even though the different ranges may (and preferably do) overlap, the use of co-located RFID readers and wireless access points makes it easy for the system to determine how best to route item tag data to the correct mobile wireless device.

Figure 4:
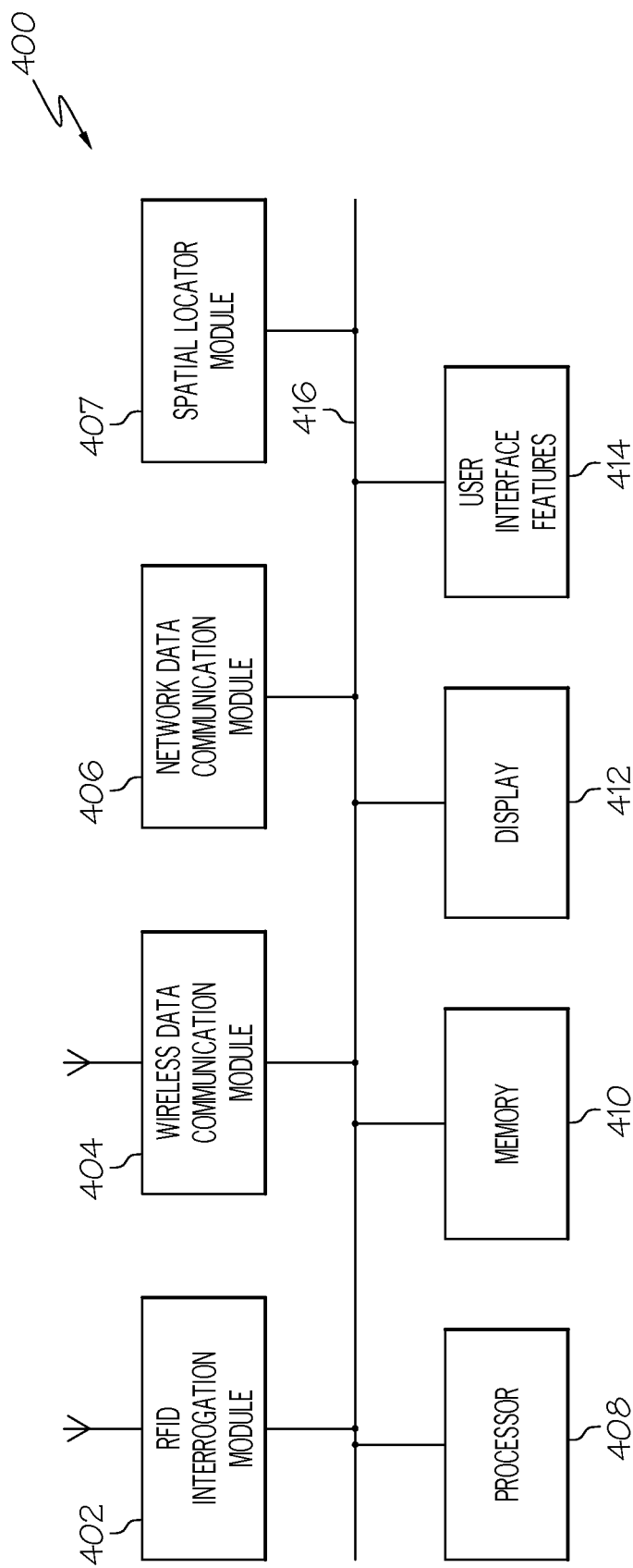
FIG. 4 is a schematic representation of an exemplary embodiment of an RFID reader.

As explained above, the RFID reader plays an important role in scanning systems 100 and 200. An exemplary RFID reader 400 will now be described with reference to the schematic representation depicted in FIG. 4. RFID reader 400 is suitably configured to support the techniques, operations, and methods described herein. FIG. 4 depicts RFID reader 400 in a simplified manner, and a practical embodiment will of course include many additional features and components. RFID reader 400 generally includes, without limitation: an RFID interrogation module 402; an optional wireless data communication module 404; a network data communication module 406; a spatial locator module 407; a processor 408; an appropriate amount of memory 410; a display element 412; and one or more user interface features 414. These elements may be coupled together using, for example, a bus 416 or any suitable interconnection arrangement.

RFID interrogation module 402 is suitably configured to support RFID interrogation functions of RFID reader 400. In this regard, RFID interrogation module 402 may include an RFID reader transceiver that generates RFID interrogation signals and receives reflected RFID signals generated by RFID tags in response to the interrogation signals. In certain embodiments, RFID interrogation module 402 is designed to operate in the UHF frequency band designated for RFID systems. Alternate embodiments may instead utilize the High Frequency band or the Low Frequency band designated for RFID systems. The operation of RFID readers and RFID transceivers are generally known and, therefore, will not be described in detail herein.

Wireless data communication module 404 is an optional element of RFID reader 400. For example, wireless data communication module 404 can be utilized to support a deployment such as that described above for scanning system 100, namely, a deployment where RFID reader 400 wirelessly transmits the item tag data directly to the mobile wireless device. In contrast, wireless data communication module 404 need not be utilized in a deployment such as that described above for scanning system 200, namely, a deployment where RFID reader 400 routes the item tag data to a wireless access device. In preferred embodiments, wireless data communication module 404 is compliant with IEEE Specification 802.11 (any applicable variant). In alternate embodiments, however, wireless data communication module 404 may additionally or alternatively support other wireless data communication protocols, techniques, or methodologies, including, without limitation: RF; IrDA (infrared); Bluetooth; ZigBee (and other variants of the IEEE 802.15 protocol); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; ultra-wideband (UWB); or proprietary wireless data communication protocols such as variants of Wireless USB.

Network data communication module 406 may also be an optional element of RFID reader 400. For example, network data communication module 406 can be utilized to support a deployment such as that described above for scanning system 200, namely, a deployment where RFID reader 400 routes the item tag data to a wireless access device via a network. In contrast, network data communication module 406 need not be utilized in a deployment such as that described above for scanning system 100, namely, a deployment where RFID reader 400 need not rely on a network for routing the item tag data. In practice, network data communication module 406 supports any number of suitable data communication protocols, techniques, or methodologies, including, without limitation: Ethernet; home network communication protocols; USB; IEEE 1394 (Firewire); hospital network communication protocols; and proprietary data communication protocols.

Spatial locator module 407, which may be realized using hardware, software, processing logic, and/or firmware, is suitably configured to calculate spatial distances and determine the location of RFID tags within the system environment. Spatial locator module 407 may leverage any number of known locationing techniques, methodologies, or algorithms. Notably, some or all of the functionality of spatial locator module 407 may also be implemented in mobile wireless devices in the system.

Processor 408 may be any general purpose microprocessor, controller, or microcontroller that is suitably configured to control the operation of RFID reader 400. In practice, processor 408 may execute one or more software applications that provide the desired functionality for RFID reader 400. Memory 410 may be realized as any processor-readable medium, including an electronic circuit, a semiconductor memory device, a ROM, a flash memory, an erasable ROM, a floppy diskette, a CD-ROM, an optical disk, a hard disk, an organic memory element, or the like. As an example, memory 410 is capable of storing the item tag data and/or the device tag data captured by RFID reader 400.

Display 412 and user interface features 414 function as input/output elements for the operator of RFID reader 400. Display 604 and user interface features 414 can be used as necessary to support input/output functions in a conventional manner. Some embodiments of RFID reader 400 need not include display 604 and/or user interface features 414.

Operation of an exemplary scanning system will now be described with reference to FIG. 5, which depicts the scan ranges for mobile wireless devices, and with reference to FIGS. 6 and 7, which depict a flow chart of an embodiment of a wireless scanning process 600. The various tasks performed in connection with process 600 may be performed by software, hardware, firmware, or any combination thereof. For illustrative purposes, the following description of process 600 may refer to elements mentioned above in connection with FIGS. 1-4. In practice, portions of process 600 may be performed by different elements of the described system, e.g., an RFID reader, a wireless access device, a mobile wireless device, or the like. It should be appreciated that process 600 may include any number of additional or alternative tasks, the tasks shown in FIGS. 6 and 7 need not be performed in the illustrated order, and process 600 may be incorporated into a more comprehensive procedure or process having additional functionality not described in detail herein.

Figure 5:
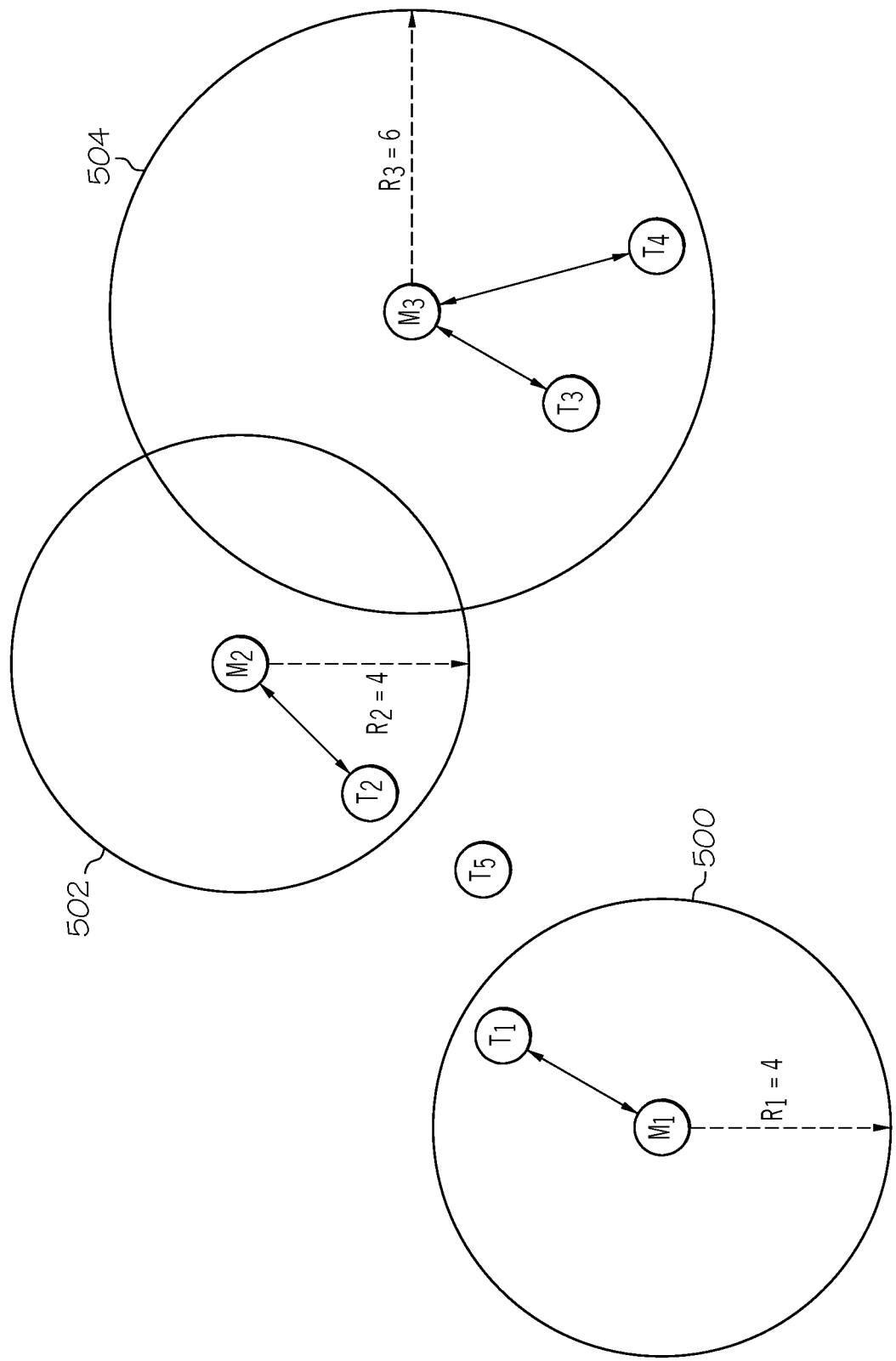
FIG. 5 is a diagram that illustrates scan ranges of three mobile wireless devices.

FIG. 5 is a diagram that illustrates the scan ranges for three mobile wireless devices, labeled $M_1$, $M_2$, and $M_3$. For this example, mobile wireless devices $M_1$ and $M_2$ each has a designated scan range radius of four inches, while mobile wireless device $M_3$ has a designated scan range radius of six inches. Thus, mobile wireless device $M_1$ has an associated scan range 500, mobile wireless device $M_2$ has an associated scan range 502, and mobile wireless device $M_3$ has an associated scan range 504. Notably, the system may accommodate configurable scan range radii on a device-by-device basis. In other words, the scan ranges of all mobile wireless devices in the system need not be the same.

It should be appreciated that FIG. 5 depicts scan ranges 500, 502, and 504 as two-dimensional circles for simplicity and ease of description. In reality, a scan range or zone for a mobile wireless device will actually be defined by a three-dimensional boundary, which can be modeled as a spherical area around the mobile wireless device. Of course, an actual scan range might be non-spherical and may assume any uniform or non-uniform three-dimensional shape.

FIG. 5 depicts a scenario where triggering of mobile wireless device $M_1$ results in the interrogation of item RFID tags within the environment, possibly including all of the item RFID tags labeled $T_1$ to $T_5$. However, since item RFID tag $T_1$ is the only tag located within the scan range 500 of mobile wireless device $M_1$, the system forwards the item tag data for item RFID tag $T_1$ to mobile wireless device $M_1$ in response to the triggering of mobile wireless device $M_1$. Similarly, triggering of mobile wireless device $M_2$ results in the presentation of the item tag data for item RFID tag $T_2$ to mobile wireless device $M_2$ (because the distance between RFID tag $T_2$ and mobile wireless device $M_2$ is less than the designated scan radius, four inches).

FIG. 5 also illustrates a scenario where two item RFID tags ($T_3$ and $T_4$) are located within scan range 504 of mobile wireless device $M_3$. In response to a triggering event at mobile wireless device $M_3$, the system will disregard or ignore the item tag data received from item RFID tags $T_1$, $T_2$, and $T_5$, because those tags are outside the boundary of scan range 504. However, the system may be suitably configured to process the item tag data for item RFID tags $T_3$ and $T_4$. For example, the system may obtain the distances between mobile wireless device $M_3$ and item RFID tags $T_3$ and $T_4$, determine which item RFID tag is closer, and assume that the closest item RFID tag is the one the user intended to scan. Alternatively, the system may display the item tag data for both item RFID tags $T_3$ and $T_4$ to the user, to facilitate user selection of the desired item tag data. Of course, if a number (N) of item RFID tags are located with scan range 504, then the user may be prompted to select the item tag data for one of N possible tags.

Note that item RFID tag $T_5$ corresponds to an item that is not within the current scan range of any of the mobile wireless devices shown in FIG. 5. Consequently, item RFID tag $T_5$ will not be "scanned" by any of these mobile wireless devices. If, however, one of the mobile wireless devices is moved closer to item RFID tag $T_5$, such that the scan zone encompasses item RFID tag $T_5$, then the system can forward the corresponding item tag data to that mobile wireless device.

Figure 6:
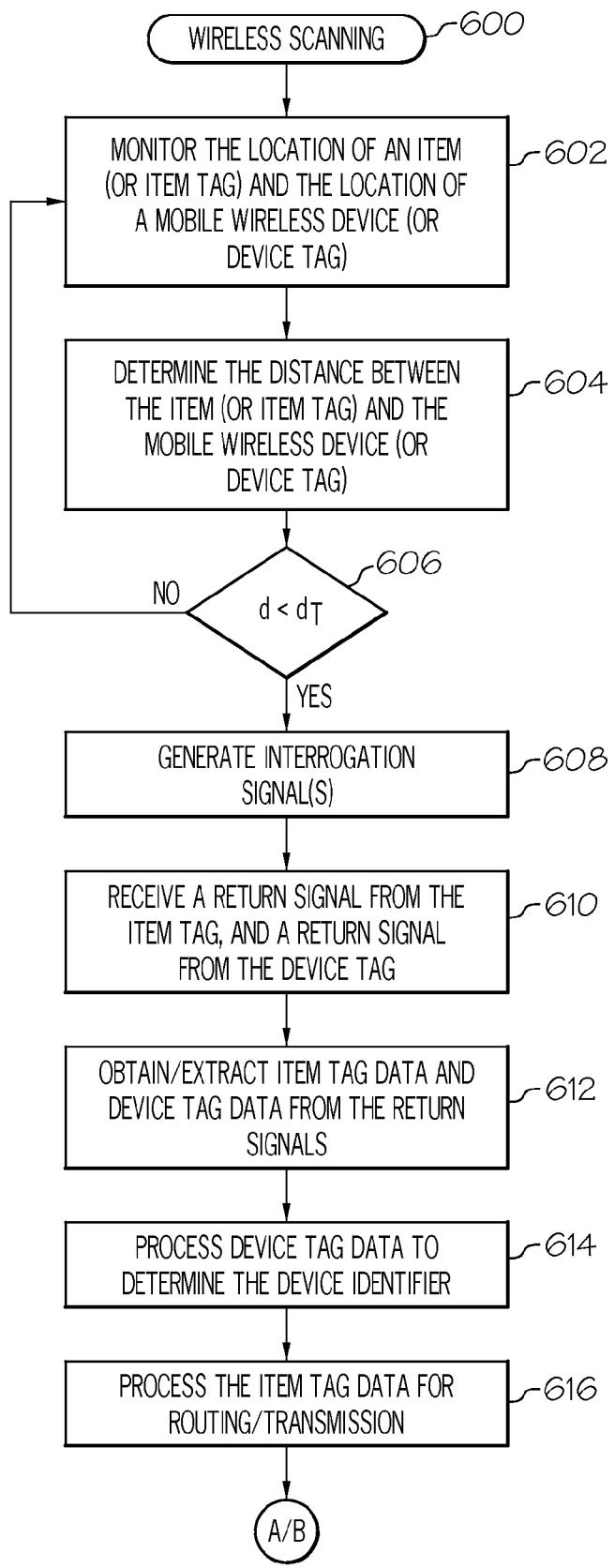
FIGS. 6 and 7 depict a flow chart of an embodiment of a wireless scanning process.

Referring to FIG. 6, wireless scanning process 600 monitors the location of an item of interest (or, equivalently, the location of the item RFID tag for that item of interest), and monitors the location of the mobile wireless device (or, equivalently, the location of the device RFID tag for that mobile wireless device) (task 602). In certain embodiments, task 602 monitors the location of the item RFID tag and the location of the device RFID tag. In practice, one or more RFID readers in the system can perform the location monitoring of task 602. In this regard, an RFID reader may leverage any number of known locationing or positioning techniques and methodologies. For example, an RFID reader may monitor and determine the current location of the item RFID tag and the device RFID tag using triangulation techniques, GPS technology, Time of Arrival (ToA) techniques, Angle of Arrival (AoA) techniques, high resolution timers, correlators, or the like. For example, correlators can be used with ToA calculations to determine the positions of the tags within the operating environment. Angle of arrival and beamforming techniques can also be utilized to determine the locations of RFID tags.

Process 600 also determines the current distance between the item RFID tag and the device RFID tag (or, equivalently, the current distance between the item and the mobile wireless device) using the monitored location data (task 604). In certain embodiments, task 604 computes the distance between the tags. Thereafter, process 600 checks whether the calculated distance is less than a specified threshold distance (query task 606). If the distance is not less than the threshold distance, then process 600 may exit or be re-entered at task 602 to continue monitoring the locations. If, however, process 600 detects that the distance between the item location and the device location is indeed less than the threshold distance, then process 600 may proceed to a task 608.

Task 608 is associated with the generation of one or more interrogation signals by the RFID reader. In this regard, the RFID reader may generate one or more RFID interrogation signals to interrogate RFID tags within its interrogation range. Assuming that both the item RFID tag (for the item of interest) and the device RFID tag (for the mobile wireless device that near to the item of interest) are within the interrogation range, task 608 will interrogate the item RFID tag and the device RFID tag. In response to the interrogation signal(s), the RFID reader receives a return signal from the item RFID tag, and another return signal from the device RFID tag (task 610). The return signal from the item RFID tag conveys information related to, associated with, and/or corresponding to the item of interest (referred to herein as "item tag data"). The return signal from the device RFID tag conveys information related to, associated with, and/or corresponding to the mobile wireless device (referred to herein as "device tag data").

In alternate embodiments, the interrogation procedure need not be dependent upon a monitored distance between items, item tags, the mobile device, and/or the device tag. Rather, the interrogation procedure may begin in response to a user-actuated triggering event, such as a voice command, a physical gesture, or the activation of a button, switch, or user interface element at the mobile device. For example, the system may be configured such that the user can press a button or pull a trigger on the mobile device after placing the mobile device near to an item to be scanned—manipulation of the button or trigger causes the mobile device to send an interrogation request to the RFID reader, which then carries out task 608 as described above.

Process 600 may then proceed to obtain or extract item tag data and device tag data from the respective return signals (task 612). Thereafter, the RFID reader can process the device tag data (task 614) to determine or obtain the device identifier for the mobile wireless device. As described above, this device identifier may identify the mobile wireless device so that the RFID reader can determine how best to route/transmit the item tag data. In this regard, the RFID reader may process the item tag data (task 616) in an appropriate manner for routing, transmission, communication, or transfer to the mobile wireless device in accordance with the device tag data (more specifically, in accordance with the device identifier). The processing performed during task 616 readies the item tag data for routing, transmission, communication, or transfer in a manner destined for the given destination mobile wireless device.

Figure 7:
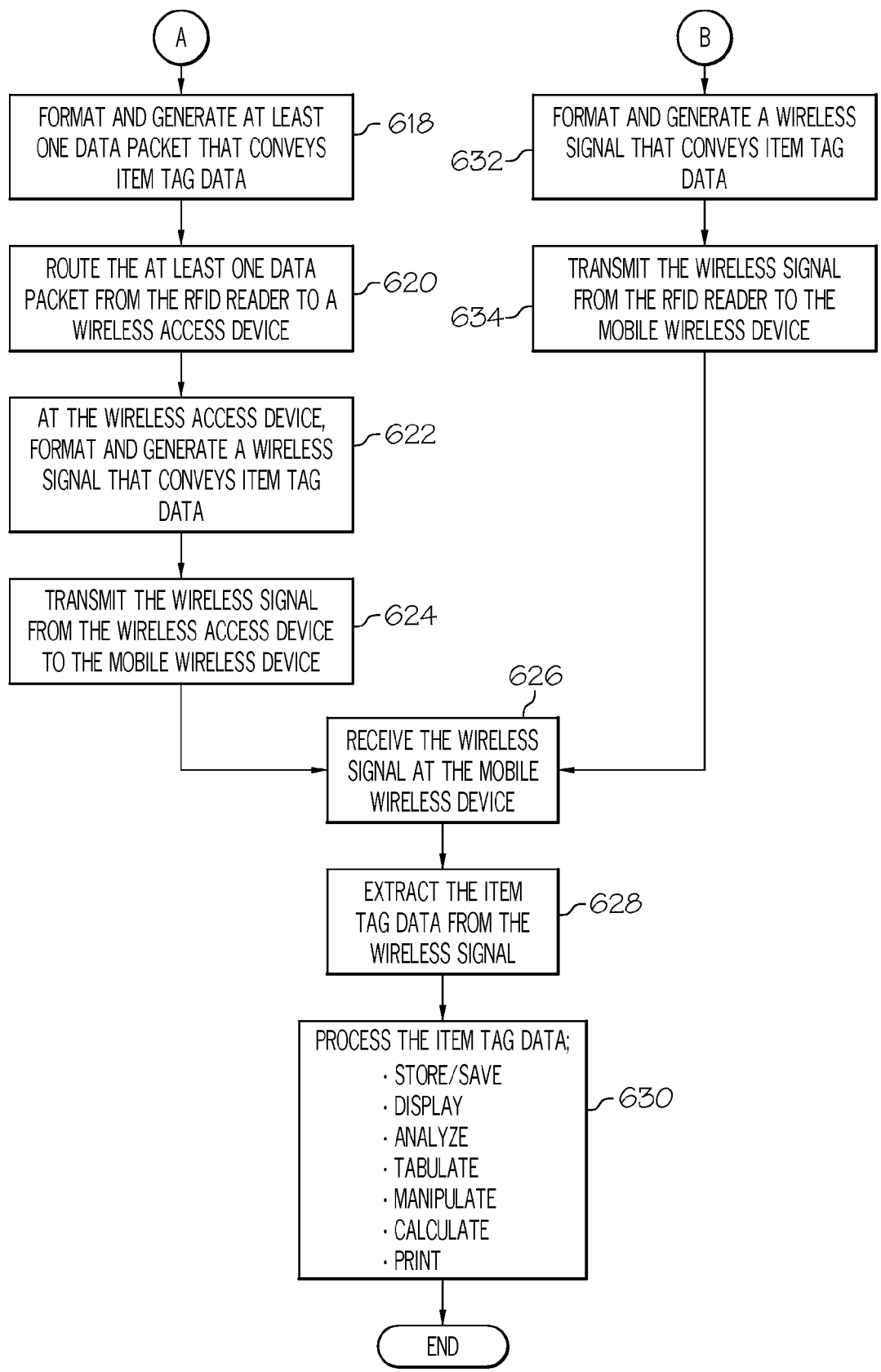

Referring now to FIG. 7, the item tag data may be transferred to the mobile wireless device in at least two different ways (indicated by the branches labeled "A" and "B" in FIG. 7). For the embodiment depicted by branch "A," process 600 formats and generates at least one data packet that conveys at least a portion of the item tag data (task 618). In practice, data packets sent from the RFID reader may be protected using encryption, security, authentication, or other techniques to ensure that wireless devices other than the intended mobile wireless device cannot receive or extract the information. For this particular embodiment, the data packet(s) will convey the device identifier of the mobile wireless device. Next, process 600 routes the data packet(s) from the RFID reader to a wireless access device (task 620). In certain embodiments, task 620 routes the data packet(s) to the wireless access device that is assigned to the RFID reader (see FIG. 3 and related description above). Upon receipt of the data packet(s), the wireless access device may process the data packet(s) in an appropriate manner. The wireless access device may also format and generate a wireless signal that conveys at least a portion of the item tag data (task 622). In certain embodiments, task 622 formats this wireless signal for compliance with the particular wireless data communication scheme employed by the wireless access device, e.g., 802.11. Thereafter, this wireless signal is transmitted from the wireless access device to the mobile wireless device over an air channel or wireless link (task 624). Notably, the wireless signal is directed to the destination mobile wireless device, as specified by the device identifier. In this manner, the routing of the item tag data is influenced, controlled, and/or governed by the device identifier.

FIG. 7 assumes that the wireless signal is actually received at the mobile wireless device (task 626). Thereafter, the mobile wireless device can extract or otherwise obtain the item tag data from the wireless signal (task 628). In addition, the mobile wireless device may process, handle, or manipulate the extracted item tag data as needed or as required by the particular application or system deployment (task 630). For example, in connection with task 630 the mobile wireless device may perform one or more of the following operations on any portion (or all) of the extracted item tag data: store or save; display; analyze; tabulate; manipulate; calculate; print; interrogate a database record; update a database record; or the like. Notably, process 600 enables the mobile wireless device to obtain and process the item tag data even though the mobile wireless device has no native RFID capabilities.

For the embodiment depicted by branch "B" in FIG. 7, the RFID reader formats and generates a suitable wireless signal that conveys at least a portion of the item tag data (task 632). In certain embodiments, task 632 formats this wireless signal for compliance with the particular wireless data communication scheme employed by the wireless access device, e.g., 802.11. Thereafter, this wireless signal is transmitted directly from the RFID reader to the mobile wireless device over an air channel or wireless link (task 634). Notably, the wireless signal is directed to the destination mobile wireless device, as specified by the device identifier. In this manner, the transmission of the item tag data is influenced, controlled, and/or governed by the device identifier.

As explained above, FIG. 7 assumes that the wireless signal is actually received at the mobile wireless device (task 626). Thereafter, process 600 continues as described above for branch "A" of FIG. 7. Again, regardless of the particular embodiment, process 600 enables the mobile wireless device to obtain and process the item tag data even though the mobile wireless device itself is incapable of interrogating RFID tags.

Notably, two or more mobile wireless devices can be operated concurrently within the same area supported by an RFID reader. As explained above, certain system embodiments employ a triggering scheme whereby users of the mobile wireless devices initiate the interrogation cycles. Each interrogation request generated by a mobile wireless device preferably identifies the originating mobile wireless device. Therefore, RFID readers that respond to a interrogation request can determine the identity of the originating mobile wireless device, calculate which item RFID tag is closest to the originating mobile wireless device, and route the returned tag data back to the originating mobile wireless device. Assuming that sufficient physical spacing is maintained between the mobile wireless devices and the item RFID tags, the system should be able to resolve concurrent interrogation requests from different mobile wireless devices and return the correct item tag data back to the respective originating mobile wireless devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A wireless scanning system, comprising:
a radio frequency identification (RFID) reader configured to interrogate RFID tags and obtain tag data from interrogated RFID tags;
a mobile wireless device configured to transmit an interrogation request to the RFID reader;
a device RFID tag coupled to the mobile wireless device, the device RFID tag configured to convey data that identifies the mobile wireless device when the device RFID tag is interrogated by the RFID reader; and
a plurality of item RFID tags each of which is coupled to an associated item of interest, wherein in response to the interrogation request the plurality of item RFID tags within a scan range of the mobile wireless device are interrogated by the RFID reader to obtain data for the associated item of interest, and
wherein information from a selected one of the plurality of item RFID tags within the scan range is sent to the mobile wireless device based on one of a predefined criterion and a user selection.

2. The system of claim 1, wherein the device RFID tag is coupled to the mobile wireless scanner device.

3. The system of claim 1, wherein the mobile wireless device is configured to scan items using a non-RFID scanning technique.

4. The system of claim 1, further comprising an item RFID tag corresponding to an item of interest, wherein the RFID reader is configured to:
interrogate the item RFID tag and the device RFID tag to obtain respective item tag data and device tag data; and
route at least a portion of the item tag data to the mobile wireless device using the device tag data.

5. The system of claim 4, wherein the RFID reader is configured to wirelessly transmit the at least a portion of the item tag data directly to the mobile wireless device.

6. The system of claim 4, further comprising a wireless access device coupled to the RFID reader, wherein:
the RFID reader is configured to route the at least a portion of the item tag data to the wireless access device; and
the wireless access device is configured to wirelessly transmit the at least a portion of the item tag data directly to the mobile wireless device.

7. A wireless scanning method, comprising:
transmitting an interrogation request to an RFID reader from a mobile wireless device having a device RFID tag;
generating a radio frequency identification (RFID) interrogation signal to interrogate RFID tags within an interrogation range in response to the interrogation request;
conveying, in response to the RFID interrogation signal, data that identifies the mobile wireless device when the device RFID tag is interrogated by the RFID reader;
interrogating, by the RFID reader, a plurality of item RFID tags each of which is coupled to an associated item of interest wherein in response to the interrogation request the plurality of item RFID tags within a scan range of the mobile wireless device are interrogated by the RFID reader to obtain data for the associated item of interest, and
sending information from a selected one of the plurality of item RFID tags within the scan range to the mobile wireless device based on one of a predefined criterion and a user selection.

8. The method of claim 7, further comprising transmitting a wireless signal to the mobile wireless device, the wireless signal conveying the item tag data.

9. The method of claim 8, wherein:
the generating, conveying, interrogating, sending, and transmitting the wireless signal steps are performed by an RFID reader; and
the transmitting the wireless signal step comprises transmitting the wireless signal directly from the RFID reader to the mobile wireless device.

10. The method of claim 8, further comprising:
receiving the wireless signal at the mobile wireless device;
the mobile wireless device extracting the item tag data from the wireless signal; and
the mobile wireless device processing the item tag data.

11. The method of claim 7, further comprising routing at least one data packet to a wireless access device, the at least one data packet conveying the item tag data.

12. The method of claim 11, further comprising transmitting a wireless signal from the wireless access device to the mobile wireless device, the wireless signal conveying the item tag data.

13. The method of claim 7, further comprising determining a distance between the mobile wireless device and the item of interest, wherein generating the RFID interrogation signal is performed when the distance is less than a threshold distance.

14. The method of claim 7, further comprising determining a distance between the device RFID tag and the item RFID tag, wherein generating the RFID interrogation signal is performed when the distance is less than a threshold distance.

* * * * *